April 23, 1957   J. T. WILLIAMSON   2,789,772
PROCESS AND APPARATUS FOR FORMING CLAY SLIP
Filed Sept. 2, 1953   3 Sheets-Sheet 1
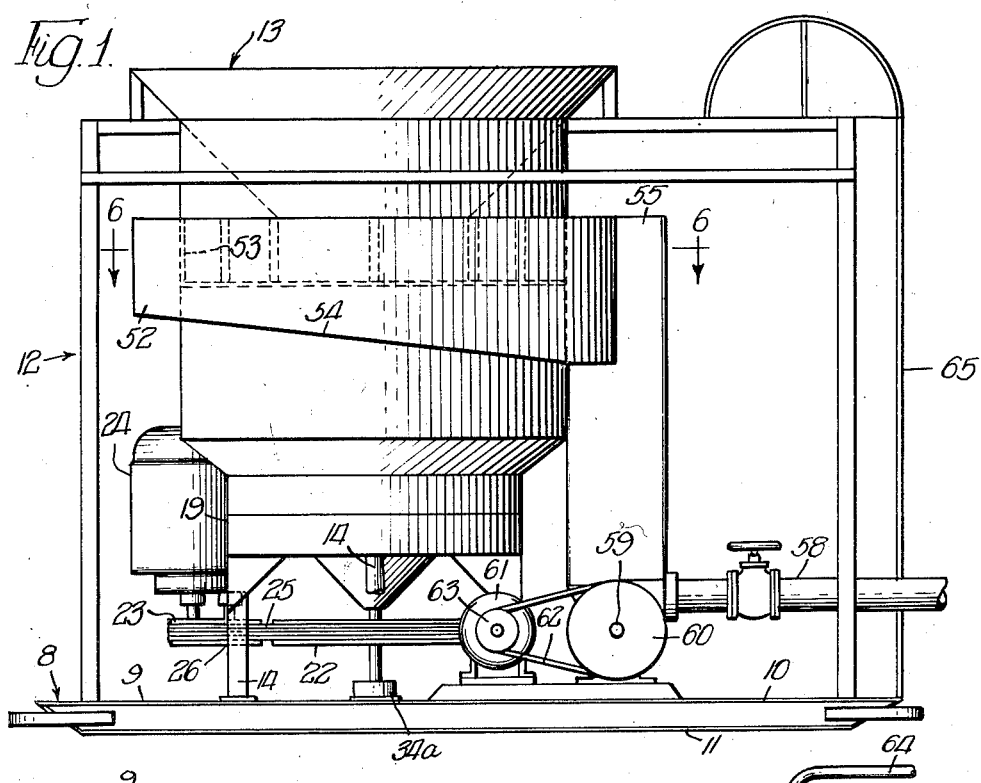
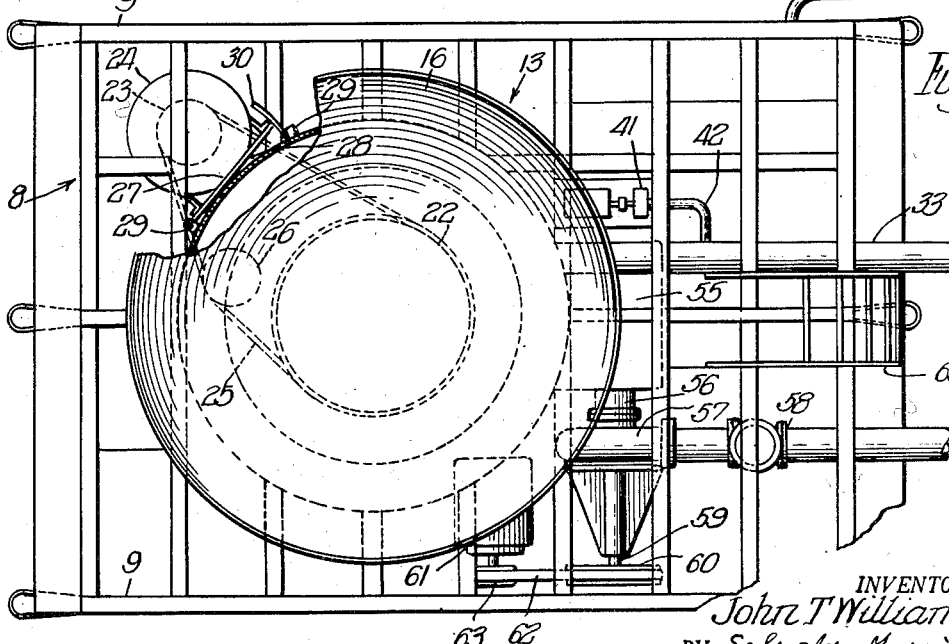
INVENTOR.
John T. Williamson,
BY Schroeder, Merriam,
Hofgren & Brady
ATTYS

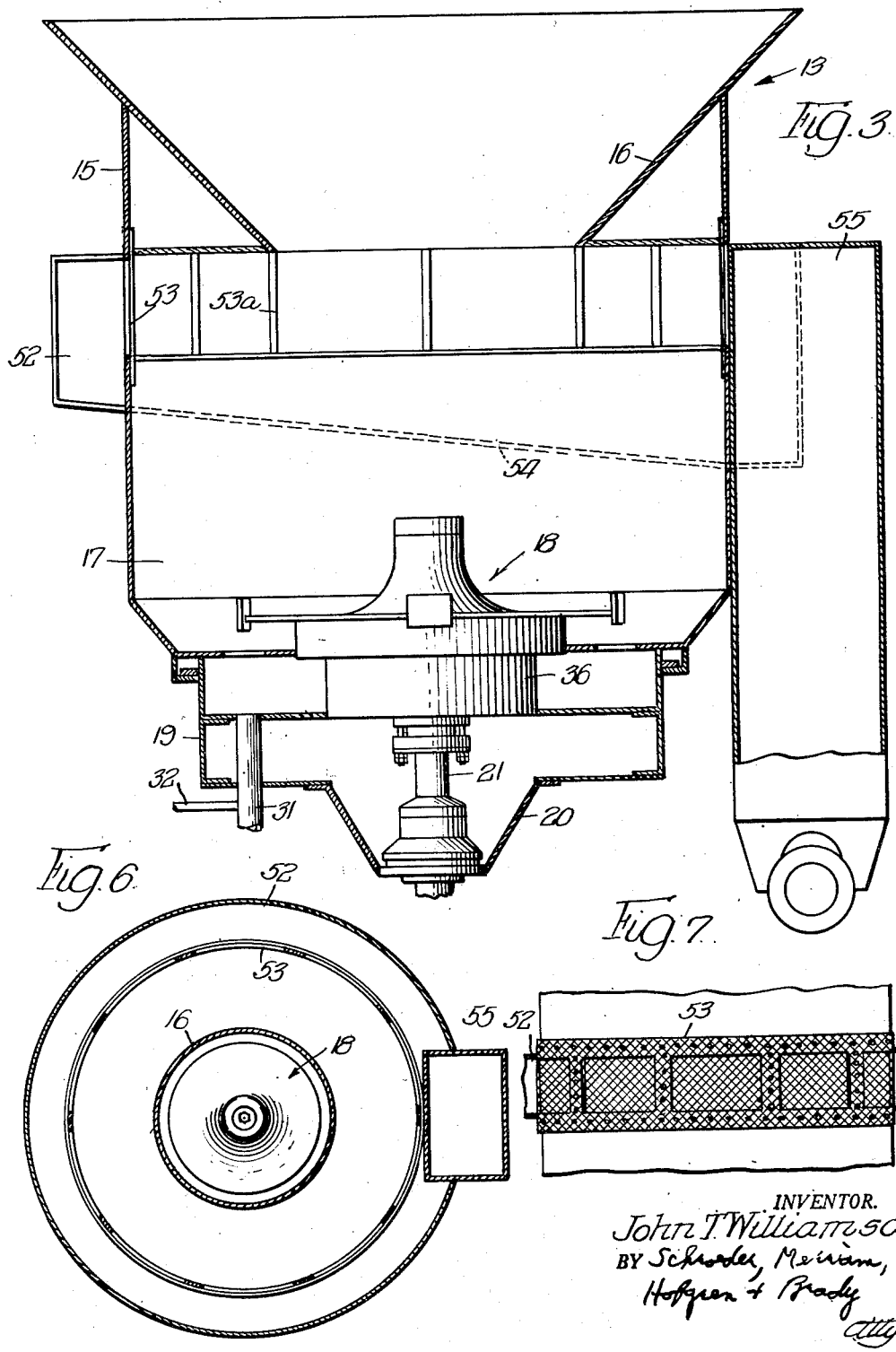

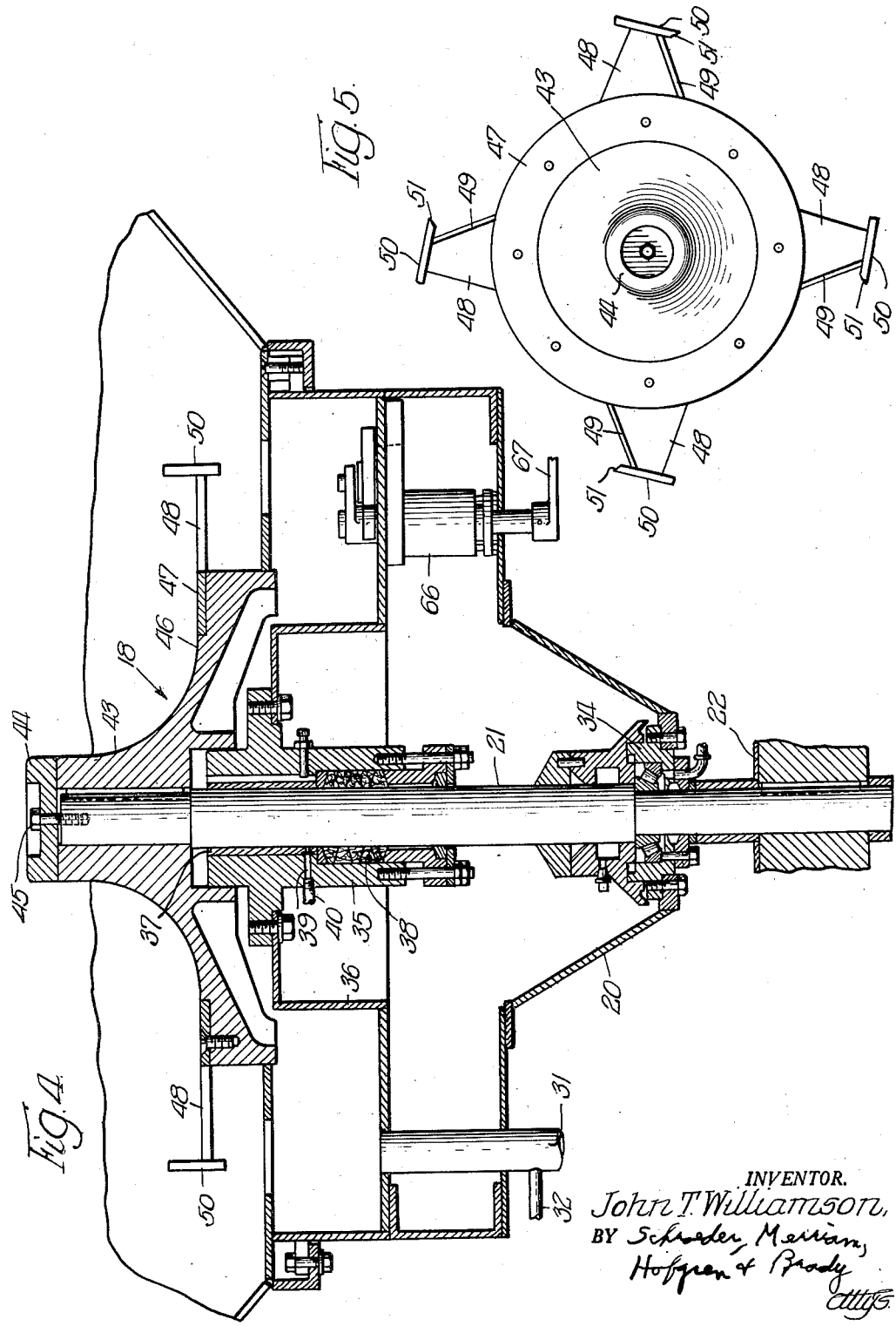

United States Patent Office 2,789,772
Patented Apr. 23, 1957

2,789,772

PROCESS AND APPARATUS FOR FORMING CLAY SLIP

John T. Williamson, Sandersville, Ga., assignor to Thiele Kaolin Company, Sandersville, Ga., a corporation of Georgia Application September 2, 1953, Serial No. 378,051

16 Claims. (Cl. 241—46)

This invention relates to a process and apparatus for forming clay slip and more particularly to the formation of clay slip directly at, and as a part of, the mining operation.

In the United States, clay, and particularly fine china clay, occurs under a consideral overburden of other material or of clay which is unsuitable for treatment. For this and other reasons, it has been the practice heretofore to mine the clay by customary excavation processes, transport the clay by truck to a central processing area at some distance from the mine, after which it is then stored in a storage heap for future use. At some time after storage, the clay is removed again to a blunging mill and formed into a slip by conventional blunging processes.

By means of the present process and apparatus, it is possible to eliminate several of the costly steps heretofore practiced and to establish a portable clay disintegrator at or in the clay mine itself and to disintegrate the raw clay at comparatively high rates of speed.

Another advantage of the present process is that not only does the present disintegrator operate at a capacity from 2 to 4 times that of known clay blungers, but it will produce a clay slip with as much as 50% less water in such fluidity that it can be transmitted by pipeline for long distances without settling.

In order to accomplish this, I have provided a counterflow disintegrator including as its essential disintegrating element disintegrating knives and particularly knives arranged to provide a shaving or paring action.

The counterflow of water and clay into the blunger, in combination with the rapidly rotating disintegrating element which has the disintegrating knives mounted at its periphery, produces a violent vortex action during which uncrushed crude clay may be thoroughly mixed with water and chemicals at a high rate of speed in a continuous operation. The unit has a smooth bottom formed of metal plates reinforced by longitudinal stringers so that it may be readily moved from place to place in a mine along with a drag line which is used for removing the overburden and also for charging the disintegrator with crude clay. Thus, the entire operation is extremely flexible.

The invention is illustrated in a preferred embodiment in the accompanying drawings in which:

Fig. 1 is a side elevation of the apparatus of the invention;

Fig. 2 is a top plan view thereof, with a portion broken away to show the motor mounting;

Fig. 3 is a fragmentary vertical central sectional view of the apparatus on an enlarged scale, the disintegrator head being shown in elevation;

Fig. 4 is a vertical central sectional view of the disintegrator mechanism;

Fig. 5 is a plan view of the disintegrator head on a reduced scale;

Fig. 6 is a fragmentary sectional view taken as indicated along the line 6—6 of Fig. 1; and Fig. 7 is a fragmentary elevational generally schematic view of the screen shown in Fig. 6.

Referring to the drawings in greater detail, and referring first to Figs. 1 and 2, the apparatus of the invention includes a base frame, indicated generally at 8, having three longitudinal stringers 9 sheathed by top sheet metal plates forming a floor 10 and bottom plates forming a sled surface 11, upon which it may be moved from place to place in a clay pit. An upright frame, indicated generally at 12, surrounds a blunger unit, indicated generally at 13, which is supported on legs 14.

As best seen in Fig. 3, the blunger unit 13 has a cylindrical outer shell 15 which is formed of sheet metal, and in the top of the shell 15 is a clay feed hopper 16 through which uncrushed crude clay may be fed into a blunger chamber 17 which occupies the lower part of the shell 15. Within the blunger chamber 17 is a disintegrator unit, indicated generally at 18. At the lower end of the blunger unit 13, below the disintegrator unit 18 is a supporting casing 19 which has a frusto-conical bottom portion 20 affording a support for a vertical spindle 21 of the disintegrator 18. Referring again to Fig. 1, beneath the spindle support 20 the spindle 21 is provided with a large driven pulley 22 by means of which the spindle may be connected to a drive pulley 23 of an electric motor 24 through multiple V drive belts 25. An idler pulley 26 is mounted beneath the supporting frame 19 to prevent the drive belts 25 from running off the pulleys.

The drive belts 25 may be adjusted in any desired manner, and as a specific example of a mechanism for adjusting the belt tension, the motor 24 is shown in Fig. 2 as being mounted upon a hinged base plate 27 which is secured to a supporting plate 28 which is carried on legs 29 anchored to the blunger shell, there being a suitable retaining member 30 for holding the hinged plate 27 in any desired adjusted position in relation to the plate 28.

The motor 24 is a 100 H. P. motor which operates at 1160 R. P. M.. The pulley 23 is preferably 13 inches in diameter and the pulley 22 is 50 inches in diameter so that the disintegrator head 18 rotates at approximately 300 R. P. M.

A mixture of water and a dispersing agent for forming a clay slip may enter the blunger chamber 17 through an inlet pipe 31, the dispersing agent being introduced into the pipe 31 through a chemical line 32 which communicates with a tank containing a supply of chemical. In the illustrated embodiment the chemical supply is remote from the portable unit and flows through a rubber hose; although it is obvious that a chemical tank could be mounted adjacent the blunger unit 13. The water inlet pipe 31 extends beneath the blunger unit and has connected thereto, a rubber hose 33 (see Fig. 2) which is coupled to a pressure water system.

Referring next to Fig. 4, the disintegrator unit 18 has its shaft 21 supported in a suitable roller bearing assembly 34 which is mounted in the base of the spindle support 20 in the bottom of the blunger unit 13 and has its lower end supported in a thrust bearing 34a on the floor 10. The upper portion of the shaft 21 passes through a stuffing box 35 which is bolted to a central supporting frame 36 which forms the inside wall of the blunger chamber 17. The stuffing box 35 has a fiber bearing 37 and a packing 38 between which is a fitting 39 which receives a water line 40 which connects with a water seal pump 41 in a water line 42 communicating with the water supply hose 33 (see Fig. 2).

Keyed to the upper end of the shaft 21 above the stuffing box 35 is a disintegrator head 43 which is retained in place on the shaft by means of a head cap 44 which receives a bolt 45.

Referring particularly to Figs. 4 and 5, the disintegrator head 43 has a flaring skirt 46 to receive a mounting ring 47 on which are four radially extending cutter arms 48. Each of the arms 48 has a beveled forward edge 49 which serves as a web blade, and at the end of each of the arms 48 is an upright peripheral blade 50 having an inwardly beveled forward edge 51 providing a cutting edge which produces a lathe-like shaving, or paring action on the clay which it contacts. Each of the upright blades 50 is turned diagonally inwardly with respect to a line tangent to the end of the arm 48 at an angle of 8° to said tangent line. The angular disposition of the upright blades 50 is of considerable importance in producing the desired agitation, and the paring type of cutting action. The web blades 49 are disposed at an angle of 120° to the upright blades 50, and have their adjacent ends somewhat to the rear of the forward sharpened edges of said upright blades. The web blades 49 are mounted about one-fourth of the distance up the upright blades 50. In a disintegrator head 40 inches in diameter, 6 inch vertical blades ¾ inch thick have proved satisfactory, and the web blades are approximately 4 inches wide at the outside and 8 inches wide at the inside portions. The web blades are preferably bolted to the ring 47 so that they may be replaced when necessary. The 40 inch diameter of the disintegrating head 18 is important in combination with the 300 R. P. M. rate of rotation of the disintegrator head.

As best seen in Fig. 3, at the upper end of the blunger chamber 17 is a peripheral discharge weir 52 which is separated from the blunger chamber by a perforated screen 53 supported by posts 53a and the weir has an inclined outlet 54 which communicates with a surge tank 55. The screen 53 has ⅛ inch openings on ¼ inch centers. At the lower end of the surge tank is a discharge pipe 56 which communicates with a centrifugal pump 57 for pumping the slip to any desired location for storage or further processing. Since the apparatus is portable, the discharge side of the pump 57 communicates with a rubber hose 58. The pump has a drive shaft 59 provided with a pulley 60 by means of which the pump is driven from a motor 61 through a belt 62 which is trained over the pulley 60 and a motor pulley 63. The pump motor 61 is a 40 H. P. motor which operates at 1,750 R. P. M.

The water supply hose 33 and the slip discharge hose 58 are suitably 6⅝ inches outside diameter.

Power for operating the motors 24 and 61 and auxiliary power is derived through an electric conduit cable 64 which may conveniently be a standard 200 ampere, 259 strand, three conductor, portable mine cable.

The apparatus may be open on the sides, as shown, or may conveniently be enclosed by appropriate panels around its side walls, some of which are stationary and some of which are hinged to provide access to various parts of the mechanism. A ladder 65 is mounted at one end of the frame 12.

For convenience in draining and cleaning the blunger chamber 17, or when it is necessary to work on the disintegrator mechanism within the chamber, a suitable drain valve 66 is provided which may be controlled by a handle 67 below the blunger chamber.

When the device is in operation clay is fed into the blunger chamber 17 from above through the hopper 16 at a controlled rate by means of a drag line unit or other suitable material moving mechanism. Water and a suitable dispersing agent are introduced into the blunger chamber 17 through the water pipe 31 and the communicating chemical line 32, the mixture of water and chemical flowing upwardly into the blunger chamber 17 from below the level of the disintegrator head 18. The pH of the slip is checked continuously by means of a standard pH control installed in the discharge from the weir 52, and the desired pH of the slip is obtained by controlling the flow of chemical through the line 32 in the customary manner. The pH is controlled at the minimum level which will completely disperse the clay, which varies with the particular clay being processed.

By reason of the violent vortex action combined with the lathe-like shaving or paring action of the knives on the disintegrator head 18, the clay need not be crushed prior to being fed into the blunger chamber 17, and this eliminates one operation which is essential in usual clay processing.

The mixture of broken clay, water and chemical which is moved to the top of the blunger chamber 13 is still in rather violent swirling motion, and washes against the screen 53 almost parallel to the surface thereof. In spite of the fact that the holes in the screen are rather large— ⅛ inch on ¼ inch centers—the washing action across the screen, combined with a rolling vortex action in the blunger chamber, tends to permit only very finely divided clay particles to pass through to the weir, while the heavier particles are sucked back toward the center and again pass through the blades. As a result, so-called "pinheads" of clay in the slip are normally only about 1% of the solids, which is less than in other types of blungers. Coarse non-clay impurities may occasionally run as high as 10–15%. The pinheads and coarse impurities are later removed from the slip in a sand classifier.

The relatively large screen openings serve to prevent any large build-up of impurities, such as sand and quartz, in the blunger chamber.

The flow of clay and water is coordinated so that the slip delivered from the blunger chamber 17 has a solids content of 40–45%, although 50% is perfectly satisfactory. Likewise, the rate of clay feed and rate of water feed are controlled so that the slip, consisting only of fully disintegrated, or blunged, clay and water, may pass upwardly out of the disintegrating zone in the lower portion of the blunger chamber 17, the slip passing outwardly through the screen 53 and into the weir 52 for discharge by way of the surge tank 55.

The foregoing detailed description is given for clearness of understanding only and no unnecessary limitations are to be understood therefrom, as some modifications will be obvious to those skilled in the art.

I claim:

1. Apparatus for forming clay slip comprising: a chamber; means for feeding clay into said chamber; means for feeding water into said chamber; means for feeding a dispersing agent into said chamber; a rapidly rotatable head in said chamber having a plurality of cutter arms, each of said arms having a generally horizontally disposed cutting blade with a sharpened forward edge and an upright blade at its end which is disposed at a small angle to a line tangent to the end of the arm, said upright blade having a sharpened forward edge which lies inside said line; and means for withdrawing clay slip from the top of said chamber.

2. The apparatus of claim 1 in which the cutting edges of said horizontally disposed cutting blades are at the lower faces thereof and the cutting edges of the upright blades are at the outer faces of said blades.

3. Apparatus for forming clay slip comprising: a chamber; a hopper through which raw clay may be fed into said chamber from above; a conduit for feeding water and a dispersing agent into said chamber from below; an upright, rapidly rotatable spindle in said chamber; a head on said spindle having a plurality of arms each of which has a generally horizontally disposed web blade and an upright blade at its end, said blades having sharpened forward edges; a peripheral disposed, foraminous screen at the top of the chamber to permit the passage only of clay particles smaller than a predetermined size; and a discharge weir surrounding said screen whereby said apparatus may operate continuously with only fully dispersed clay slip discharging into said weir.

4. Apparatus for forming clay slip comprising: a chamber having a generally cylindrical side wall; a hopper through which raw clay may be fed into said chamber from above; a conduit for feeding water and a dispersing agent into said chamber from below; an upright, rapidly rotatable spindle in said chamber; a head on said spindle having a plurality of arms adjacent the bottom of the chamber, each of said arms having a generally horizontally disposed cutting blade and an upright blade at its end, said blades having sharpened forward edges, rotation of said arms producing a rolling, vortex action of the slip in the chamber so that slip adjacent the wall of the chamber impinges on the wall at a small angle and slip near the top of the chamber away from the wall is drawn inwardly and down through the arms; a peripherally disposed, foraminous screen in the wall of the chamber substantially above said arms to permit the passage only of solid particles smaller than a predetermined size, the angular impingement of slip flow on said screen being such that the great majority of particles passing through the screen are only a fraction of the size of the screen opening; and a discharge weir surrounding said screen, whereby said apparatus may operate continuously with only fully dispersed clay slip discharging into said weir.

5. The apparatus set forth in claim 3 wherein said chamber is substantially cylindrical in shape.

6. In an apparatus adapted to form clay slip and the like comprising a chamber wherein a disintegrator head assembly is adapted to rapidly rotate about a vertical axis, the improvement comprising: a disintegrator head assembly having a plurality of horizontally disposed cutting arms provided with blades having forwardly facing shearing type cutting edges, upright blades placed at the outer end of said arms which are inclined with their forward end inwardly from a line tangent to the end of the arm.

7. The apparatus as set forth in claim 6 in which the upright blade has about three-fourths of its height above the horizontally disposed cutting blade.

8. The apparatus set forth in claim 7 in which the upright blade is disposed at an angle of at least about 8° to the tangent line.

9. The apparatus set forth in claim 8 in which the front edge of the horizontally disposed cutting blades are disposed at an angle of about 120° to the associated upright blade and has its outer end slightly to the rear of the forward edge of said upright blade.

10. Apparatus for forming a clay slip comprising a chamber, a hopper above said chamber through which raw clay may be fed into the chamber, means for feeding water into the chamber from below, means for feeding a dispersing agent into the chamber, an upright rapidly rotatable spindle in said chamber, drive means for the spindle, a head on said spindle having a plurality of arms having generally horizontally disposed blades and upright cutting blades at the end thereof, a foraminous screen at the top of the chamber to permit the passage only of clay particles smaller than a predetermined size; and a discharge weir surrounding said screen whereby said apparatus may operate continuously with only dispersed clay slip discharging into said weir.

11. Apparatus for forming clay slip comprising: a chamber; means through which raw clay may be fed into said chamber, means through which a counter flow of water may be fed into said chamber, and means through which a dispersing agent may be fed into said chamber; a rapidly rotatable head adapted to rotate about its vertical axis in said chamber having a plurality of cutter arms provided with blades having forwardly facing cutting edges so that when said head is rotated the mixture is violently agitated with a vortex action and the clay is subjected to a shearing type of cutting action, each of said cutter arms having a horizontally disposed cutting blade and a straight upright blade at its outer end which is inclined with its forward cutting edge inwardly from a line tangent to the end of said arms; and means for withdrawing clay slip from the top of said chamber.

12. The apparatus as set forth in claim 11 in which the upright blades have ¾ of their height above the horizontally disposed cutting blades.

13. The apparatus of claim 12 in which the upright blades are disposed at an angle of at least about 8° to the tangent line.

14. The apparatus of claim 13 in which the front edge of said horizontally disposed cutting blades are disposed at an angle of about 120° to the associated upright blades and have their outer ends slightly to the rear of said edge of said upright blades.

15. The apparatus for forming clap slip comprising: a chamber; means through which raw clay may be fed into said chamber, means through which a counter-flow of water may be fed into said chamber, and means through which a dispersing agent may be fed into said chamber; a rapidly rotatable head adapted to rotate about its vertical axis in said chamber having a plurality of cutter arms provided with blades having forwardly facing cutting edges so that when said head is rotated the mixture is violently agitated with a vortex action and the clay is subjected to a shearing type of action, each of said cutter arms having an upright blade at its outer end, said upright blades being inclined with their forward cutting edge inwardly from a line tangent to the end of the arms; and means for withdrawing clay slip from the top of said chamber.

16. In an apparatus adapted to form clay slip and the like comprising a chamber wherein a disintegrator head assembly is adapted to rapidly rotate about a vertical axis, the improvement comprising a disintegrator head assembly having a plurality of cutter arms provided with blades having forwardly facing cutting edges, said cutter arms having a horizontally disposed forward cutting blade and an upright blade at its outer end, said upright blade being inclined with its forward cutting edge inwardly from a line tangent to the end of said arms.

References Cited in the file of this patent

UNITED STATES PATENTS

| | | |
|---|---|---|
| 2,297,009 | Mead et al. | Sept. 29, 1942 |
| 2,440,601 | Dickerman | Apr. 27, 1948 |
| 2,520,320 | Lyons et al. | Aug. 29, 1950 |
| 2,577,353 | Naidu et al. | Dec. 4, 1951 |
| 2,665,853 | Nicholson | Jan. 12, 1954 |